United States Patent [19]

Schalk

[11] Patent Number: 4,835,357
[45] Date of Patent: May 30, 1989

[54] SHEET METAL LASER WELDING

[75] Inventor: Calvin W. Schalk, New Boston, Mich.

[73] Assignee: Williams International Corporation, Walled Lake, Mich.

[21] Appl. No.: 209,013

[22] Filed: Jun. 20, 1988

[51] Int. Cl.$^4$ ............................................. B23K 26/00
[52] U.S. Cl. .......................... 219/121.64; 219/121.84
[58] Field of Search ...................... 219/121.63, 121.64, 219/121.13, 121.14, 121.65, 121.66, 121.84

[56] References Cited

U.S. PATENT DOCUMENTS

| 3,716,347 | 2/1973 | Bergstrom et al. | 29/182.2 |
| 3,952,180 | 4/1976 | Gnanamuthu | 219/121.85 |
| 4,048,459 | 9/1977 | Earle | 219/121.85 X |
| 4,243,867 | 1/1981 | Earle et al. | 219/121.63 |
| 4,300,474 | 11/1981 | Livsey | 219/121.63 X |
| 4,634,832 | 1/1987 | Martyr | 219/121.63 |
| 4,644,127 | 2/1987 | LaRocca | 219/121.84 |
| 4,665,294 | 5/1987 | Hira et al. | 219/121.64 |

FOREIGN PATENT DOCUMENTS 58-65592 4/1983 Japan .

OTHER PUBLICATIONS

Eboo, G. M., and Blake, A. G., "Laser Cladding of Gas Turbine Components", ASME Paper No. 86-GT-298, presented at the International Gas Turbine Conference and Exhibit, Dusseldorf, West Germany, Jun. 8-12, 1986.

Primary Examiner—C. L. Albritton
Attorney, Agent, or Firm—Lyman R. Lyon

[57] ABSTRACT

A method for the thermal welding of contiguous sheet metal elements comprising the steps of directing a defocussed laser beam at the joint formed therebetween so as to plasticize the areas thereof proximate thereto with a substantial portion of the energy thereof, and simultaneously feeding a powdered filler material into and about the joint so as to fully encompass the area of laser beam impingement thereupon, with a portion of the filler material being heated to a plastic state by the remaining portion of the beam's energy. The powdered filler material thus partially shields the sheets from the direct impingement of the beam's full energy thereupon, whereby the likelihood of sheet burn-through and/or excessive heat distortion is greatly reduced. The plasticized filler material thereafter attaches to the plasticized area proximate with the joint and builds thereupon a homogeneous weld seam characterized by excellent weld fusion and a high joint efficiency.

5 Claims, 2 Drawing Sheets

SHEET METAL LASER WELDING

BACKGROUND OF THE INVENTION

The instant invention relates to the joining of two contiguously placed sheet metal elements utilizing laser heating of a powdered filler metal introduced into the gap therebetween. It is noted that the term "sheet metal" is generally understood in the art as denoting a metal sheet having a thickness of less than one-eighth of an inch, in contradistinction with "metal plate," which term encompasses metal sheets having a thickness equal to or greater than one-eighth of an inch.

Known methods for joining sheet metal elements include TIC, MIC, and electron beam welding. Unfortunately, the large heat affected zone ("HAZ") generated by these methods induces heat-generated distortion of the sheet metal elements to be joined, often rendering the finished product unserviceable. And, where the application involves a corner joint, for example, heat distortion of one or both of the sheet metal elements tends to dramatically increase the gap therebetween, thereby further complicating the joining process. Moreover, it is crucial that the sheet metal elements not be heated to a molten state during the joining process in order to prevent the heat source from melting them completely away, i.e., burning a hole therethrough. It is further noted that electron beam welding requires a vacuum chamber wherein the entire workpiece is encapsulated, thereby placing severe limitations on its application.

In addition, the prior art teaches autogenous laser welding as a very rapid and economical method of welding relatively thin metallic components with a reduced HAZ. However, autogenous laser welding techniques generally require very tight joints to obtain satisfactory welds. The close tolerances thus required of the surfaces to be joined is impractical or unfeasible in many applications, such as joining two non-coplanar metal sheets at their edges as is required in a "corner joint." Moreover, since the reduced thickness of each sheet greatly diminishes the ability thereof to conduct the extreme heat generated by the welding process away from the area of laser beam impingement thereon, the risk of unacceptable heat distortion or accidental burn-through remains great, particularly with the high power densities often associated with known laser welding techniques.

To accommodate the gaps between the elements to be joined during the laser welding thereof, the prior art teaches the introduction of a filler material into the gaps therebetween. For example, in U.S. Pat. No. 4,634,832 to Martyr, a filler rod is vaporized by a laser beam focussed thereon to form a plasma which heats opposed gap faces while being deposited thereupon to fill in the gap therebetween. However where metal sheets having a thickness of less than one-eighth of an inch are to be joined, rather than metal plates as taught in Martyr, the thickness of the sheets is insufficient to provide for proper containment of the plasma therebetween. A backing strip must therefore be utilized to contain the plasma in the gap during the welding process. However, the use of such a backing strip severely limits the utility of the Martyr method. It is further noted that the patent to Martyr discourages the use of a particulate filler material in place of the rod taught therein, as a backing strip is then required, even when joining the thicker plates.

In U.S. Pat. No. 4,048,459, issued Sept. 13, 1977, to Earle, a gravity feed mechanism is utilized to deliver metal brazing powder between two powdered metal parts placed in close-spaced juxtaposition. The brazing powder, which has a lower melting point than either of the parts in order to prevent the absorption of the brazing powder thereinto, is thereafter brazed by a laser beam impinging directly and solely thereupon, whereby the parts are joined. It is noted, however, that a cavity must be purposefully formed between the parts having a configuration suitable for receiving and containing adequate amounts of filler material to effect the joining of the parts, as the gravity feed mechanism of Earle is incapable of delivering the powder into the minute cracks formed between the edges of elements placed in contiguity with one another. Obviously, such a cavity requires a backing strip or other backing member in order to contain the brazing powder which is introduced thereinto.

In U.S. Pat. No. 4,644,127, issued Feb. 17, 1987, to LaRocca, a laser welding method is taught wherein a flow of powdered material, superheated by passage through a portion of the laser beam, reaches the substrate surface so as to form a "hot blob" thereupon, whereafter it interfuses with the substrate, which was preheated by the direct impingement thereupon of the laser beam. A post-heating of the weld seam by further direct laser beam impingement thereupon is also utilized. Unfortunately, such direct impingement of the laser beam on the sheet metal elements carries with it substantial risk of heat distortion before, during, and after generation of the weld seam, as well as a greater likelihood of burning a hole through one of the sheets due to the extremely high power densities taught by LaRocca.

Similarly, in Japanese Patent No. 58-65,592 to Tokyo Shibaura Electric, Ltd., published Apr. 19, 1983, a second focussed laser beam provides for the post-heating and homogenation of superheated powder filler material deposited by the above "hot blob" technique. While neither the first laser beam utilized to superheat the powder, nor the second post-heating laser beam, impinges directly upon the metal elements to be joined, the post-heating of the pre-deposited powder blobs induces greater dilution of the composition of the metal elements, thereby effecting a change in the physical properties of the final product. Additionally, it is significant that a pre-formed channel is required between the metal elements to be joined since, as in LaRocca, the "hot blob" deposition technique of Tokyo Shibaura Electric, Ltd. is incapable of delivering the superheated powder blobs into the minute cracks formed between the edges of the metal elements placed in contiguity with one another. Moreover, it is noted that, where a gap of varying width is present between the elements to be joined, weld strength is lowered by the inability of the "hot blobs" to adequately penetrate and/or adhere to the gap faces.

It is noted that, in the related field of laser cladding, a laser is used to melt a thin surface layer of a metal substrate and a heterogenous powdered metal deposited thereupon which, upon cooling, generates a coating that is metallurgically bonded with minimum dilution to the metal substrate and has surface characteristics superior to those of the uncoated substrate. In this manner, a low cost metal article may be provided with an exotic coating having superior wear characteristics while achieving significant cost reductions.

For example, in U.S. Pat. No. 4,300,474, issued Nov. 17, 1981, to Livsey, a method and apparatus for laser cladding is taught wherein the laser beam impinges directly upon the substrate, forming a melt pool to which the powdered cladding material, partially heated by passage through the beam, is then added. As in the LaRocca patent, the fringe area of the laser beam in Livsey purposefully impinges upon an area of substrate ahead of the particulate stream to generate a molten pool therefrom, as well as upon the partially solidified metal coating subsequent to particle deposition thereon in order to further homogenize the coating and to improve fusion bonding between the coating and the substrate material. Again, where the substrate comprises a sheet metal element, such areas are susceptible to being burned completely away by the continuing, direct exposure thereof to the laser beam.

It is further noted that the Livsey patent teaches a dynamic powder feed system (hereinafter "DPF") to accommodate complex workpiece geometries for which other methods of cladding material deposition—such as pre-placed powder beds, pre-placed chips, or wire feed—are ill suited. DPF comprises the use of mechanical metering devices in combination with a gas carrier to control and assist the delivery of hard-facing powder to the workpiece.

It is the purpose of the instant invention to provide a method for joining a pair of contiguously-placed sheet metal elements having a gap of varying width in the joint therebetween with minimal heat distortion of the sheet metal elements during such joining.

A further purpose of the instant invention is to provide a method for joining a pair of contiguously placed sheet metal elements which utilizes a beam of coherent electromagnetic radiation while avoiding the direct impingement of the beam on either of the sheet metal elements.

It is also the purpose of the instant invention to improve upon existing laser welding techniques to permit the welding of sheet metal elements having gaps of varying width therebetween, without the use of a backing strip, or the need for special filler materials characteristically having lower melting temperatures than the material of the sheet metal elements.

SUMMARY OF THE INVENTION

The sheet metal laser welding method of the instant invention comprises the steps of directing a defocussed beam of electromagnetic energy towards a first area on contiguously-placed sheet metal elements in and about the gap therebetween to heat the first area to a substantially plastic state; simultaneously directing a stream of powdered filler material through the laser beam towards a second area on the sheets into and about the gap therebetween and encompassing said first area thereon; and allowing the thus substantially plasticized filler material to attach to the first area on the sheets in and about the gap therebetween so as to build up thereupon to bridge the gap, whereby the sheets are joined together.

Thus, under the instant method, powdered filler material is interposed between the laser beam and the first area of laser beam impingement on the sheets to permit the partial absorption of the beam's energy by the filler material prior to its contact with the plasticized surface of the sheets, whereby the direct exposure of the sheets to the full energy of the defocussed beam is avoided. The substantially plasticized powdered filler material is directed as by a carrier gas into the melt zone to fill the minute and variable-width gap inevitably formed in the joint between two contiguously-placed sheets lacking extensive surface preparation of the mating surfaces thereof. As the filler material enters the melt zone, it too is melted and forms an integral part of the weld. Superior fusion between the filler material and the sheets is thereby obtained without the need for post-treatment of the weld seam.

DETAILED DESCRIPTION OF THE PREFERRED EMBODIMENT OF THE INVENTION

Figure 1:
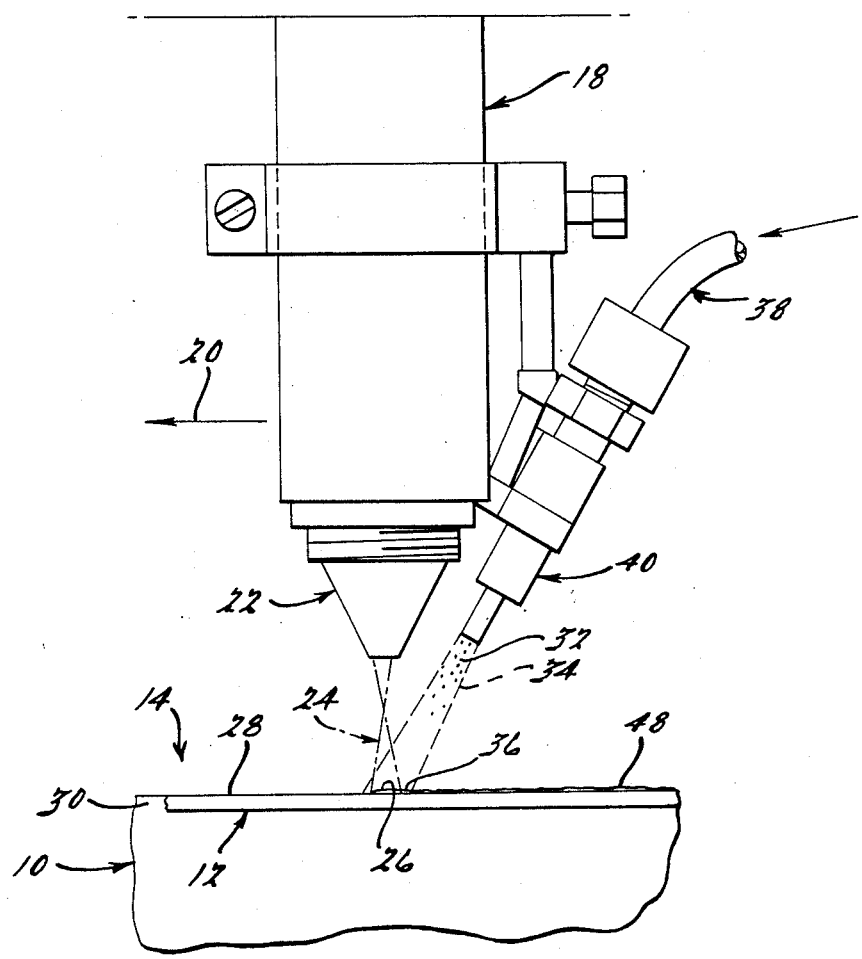
FIG. 1 is a side view in elevation of a laser and a powder feed mechanism in the process of welding together two contiguously-placed sheet metal elements according to the method of the instant invention.

Referring to FIG. 1, a pair of sheet metal elements 10 and 12 to be joined together are placed in contiguity to form a joint 14 therebetween which is characterized by a gap 16 of varying width extending between the sheets 10 and 12. The contiguous sheets 10 and 12 are positioned beneath a support 18 which is adapted by means not shown to translate at a nearly constant speed along the joint 14 in the direction indicated by the arrow 20. A laser 22 is mounted on the support 18 so that a defocussed beam 24 of coherent electromagnetic energy is directed therefrom into and about the gap 16, generally in a direction perpendicular to the direction of support translation 20, thereby irradiating an area 26 on exposed upper surfaces 28 of the sheets 10 and 12 proximate with the joint 14 therebetween, including gap faces 30 thereof (hereinafter "first area 26"). Preferably, the laser beam 24 is directed into and about the gap 16 so as to achieve maximum penetration of the beam thereinto and, hence, to permit maximum irradiation of the gap faces 30.

The exposed upper surfaces 28 and gap faces 30 within the first area 26 on sheets 10 and 12 are heated by a substantial portion of the laser beam's energy, whereby such first area 26 is brought to a substantially plastic state.

Powdered filler material 32 typically comprising a powdered metal is simultaneously fed by conventional means into and about the gap 16, as by entraining the powdered filler material 32 in a carrier gas stream to obtain a particulated gas stream 34 which is thereafter directed towards a second area 36 on the exposed upper surfaces 28 of sheets 10 and 12 proximate with the joint 14 therebetween. For example, a hopper (not shown) meters the powdered filler material 32 at a suitably constant rate into a carrier gas stream preferably comprising an inert gas such as helium, whereby the powder is entrained therein and delivered via inlet hose 38 to an adjustable spray nozzle 40 mounted on the translatable support 18 adjacent the laser 22. Adjustment of the nozzle 40 provides precise definition of the second area 36 of particulated gas stream impingement on the upper surfaces 28 of the sheets 10 and 12, as well as facilitating the delivery of filler material 32 into the gap 16 therebetween.

Significantly, the second area 38 of filler material impingement on the sheets 10 and 12 proximate joint 14 fully encompasses the first area 26 of laser beam impingement thereon. A portion 42 of the filler material 32 comprising the particulated gas stream 34 emanating from spray nozzle 40 passes through the defocussed beam 24 prior to contacting the exposed upper surfaces 28 and gap faces 30 of sheets 10 and 12 and is thus headed by the remaining portion of the beam's energy to a substantially plastic state. In this way the particulated gas stream 34 acts to partially shield the exposed upper surface 28 and gap faces 30 of sheets 10 and 12 from the direct impingement thereupon of the laser beam 24, thereby reducing the likelihood of sheet burn-through and/or unacceptably high heat distortion during the joining thereof.

Figure 3:
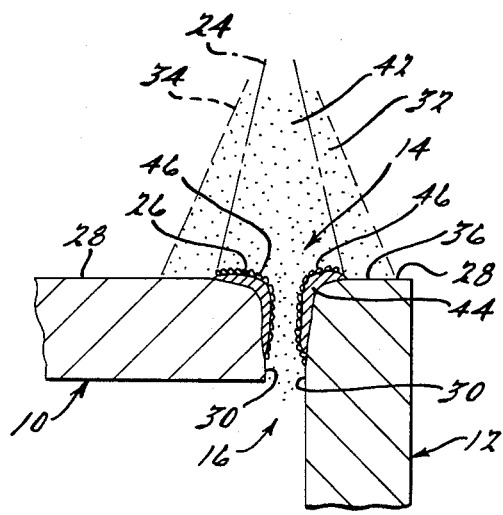
FIGS. 3-5 are views in cross-section of the joint between the two sheet metal elements along lines 3—3, 4—4 and 5—5, respectfully, of FIG. 2.
Figure 4:
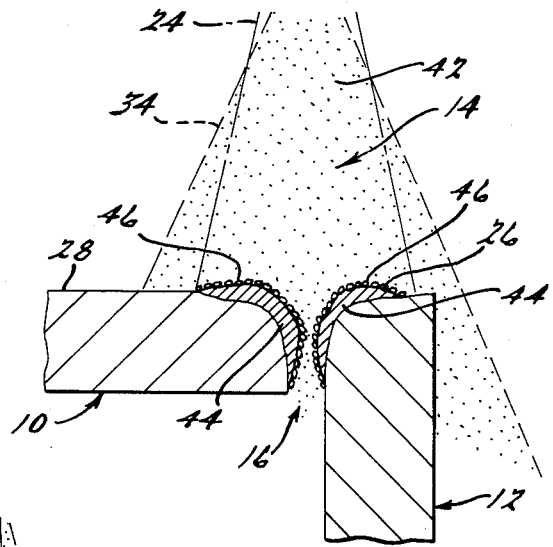
Figure 5:
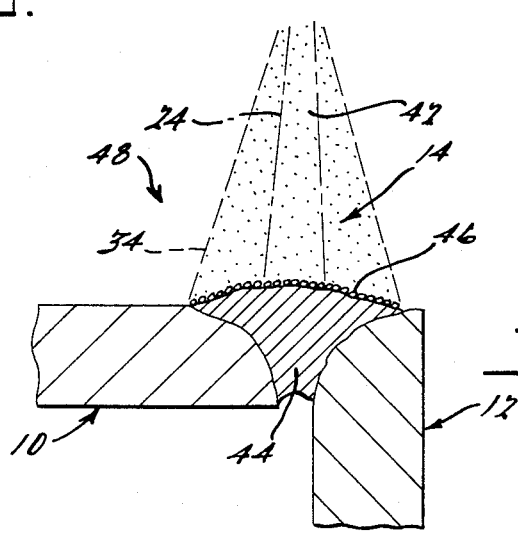

As illustrated in FIGS. 3-5, fusion occurs between the plasticized and slightly molten filler material 42 and the plasticized first area 26 proximate with joint 14 between sheets 10 and 12 upon the attachment of the filler metal 42 thereto. As a result of such fusion, the bond between the final solidified filler material 44 and the sheets 10 and 12 is extremely strong. The sheets 10 and 12 are ultimately joined together as the attached plasticized and slightly molten filler material 46 is allowed to build up on the exposed upper surfaces 28 and gap faces 30 within area 26 thereon. The gap 16 between the sheets 10 and 12 is ultimately bridged by the filler material 44 to form weld seam 48.

Translation of support 18 at a constant speed along joint 14 in the direction indicated by the arrow 20 results in a steady stream of plasticized metal filler material 42 impinging upon and attaching to newly exposed and plasticized sections of the sheets 10 and 12 proximate with and along the joint 14 therebetween, and leaving behind solidified weld seam 48.

From the foregoing, it will be readily appreciated that the particulated gas stream 34 utilized by the instant invention for delivering powdered filler material 32 into and about gap 16 is substantially "transparent" to laser beam 24, as otherwise the exposed upper surfaces 28 and gap faces 30 of sheets 10 and 12 within the first area 26 thereon could not be brought to a plasticized state in preparation for the impingement of plasticized filler material 42 thereon. Moreover, it is significant that the powdered filler material is merely preheated by the laser beam prior to contact with the substrate so as to be able to attach thereto upon such contact. Thus, the plasticized filler material 42 comprising the irradiated portion of the particulated gas stream 34 is not superheated by the beam 24 prior to its contact with the first area 26 on sheets 10 and 12, thereby avoiding the increased dilution and reduced joint quality which typically accompany such "hot blob" deposition techniques as are taught in the prior art.

The requisite degree of transparency of the particulated gas stream 34 to the electromagnetic energy of beam 24, i.e., the amount of shielding which is provided thereby, under the instant method is a function of several factors, including but not limited to: the thermal conductivity of the sheets, their thickness, and the configuration of the joint, the size of the powdered filler material and the heat absorption characteristics thereof; the power density of the laser beam as measured at the exposed surfaces of the sheets; and the acceptable level of heat distortion which may be induced without rendering the resultant welded product unserviceable.

Figure 2:
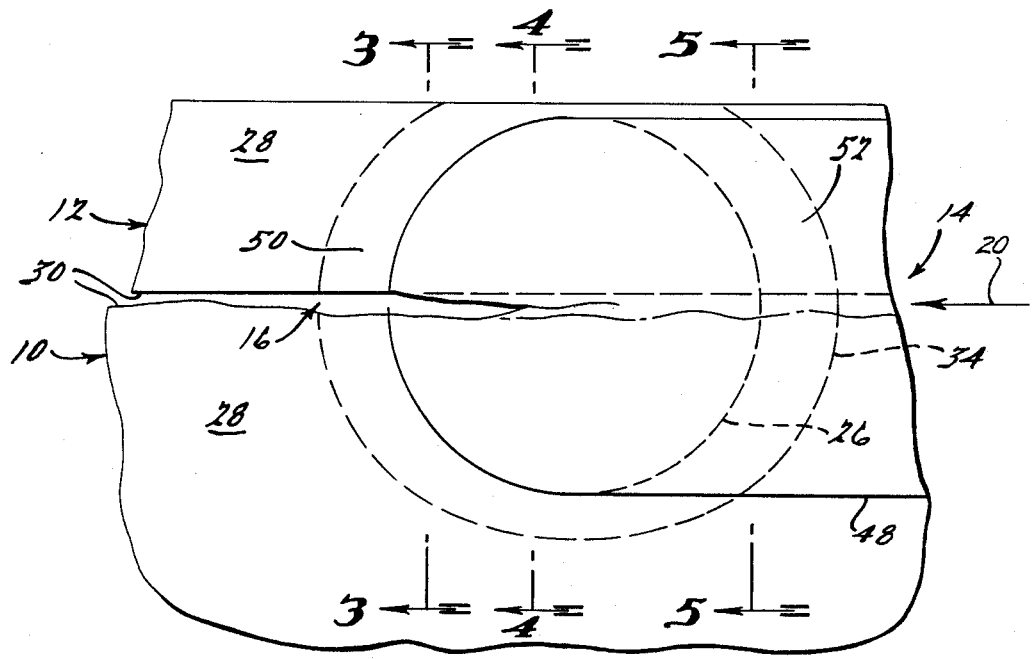
FIG. 2 is a top view of the joint thus formed between the two sheets during the welding thereof.

It is to be noted that the particulated gas stream 34 is preferably directed into and about the gap 16 from behind the weld seam 48, i.e., in the direction of travel of the laser beam relative to the joint. The resultant second area 36 of powdered filler material impingement on the sheets 10 and 12 is of an elliptical configuration, as seen in FIG. 2, thus providing extended leading- and trailing-edge portions 50 and 52 thereof, respectively, of filler material impingement on the upper surfaces 28 and gap faces 30 of sheets 10 and 12 and the weld seam 48 extending therebetween.

The upper surfaces 28 and gap faces 30 of sheets 10 and 12 within the leading-edge portion 50 of area 36 are thus blasted with powdered filler material 32, a portion 42 of which has been substantially plasticized by passage through laser beam 24, whereby the upper surfaces 28 and gap faces 30 are cleaned in preparation for subsequent attachment of plasticized filler material 42 thereto upon the heating thereof by laser beam 24. The weld seam 48 within the trailing-edge portion 52 of area 26 is blasted with the trailing-edge portion of the particulated gas stream 34 which has not been exposed to the electromagnetic energy of the laser beam 24, whereby an improved surface finish is obtained thereon.

Additionally, it is to be noted that the method of the instant invention does not require any post-heating of the weld seam 48 subsequent to the deposition of the plasticized powdered filler material 42 on area 26 on sheets 10 and 12 and the fusion or homogenation of the filler material 42 therewith as described hereinabove. The instant method thus induces less heat distortion in the sheets 10 and 12 during the joining thereof, in addition to eliminating the risk of sheet burn-through which normally accompanies such post-treatment of the weld seam 48.

The following serves as an example, and is not intended to limit the application of the method of the instant invention in any way:

EXAMPLE

For the butt welding of two contiguously placed sheets, each formed of AISI Type 304 stainless steel with a nominal thickness of 0.036 inches and having a gap therebetween of varying width not exceeding 0.020 inches, a fixed $CO_2$ laser operating at a power level of 1.5 kW and generating a defocussed beam of 0.100 inches (2.54 mm) in diameter impinges upon a first area proximate with the joint formed between the sheets in the manner described hereinabove. More specifically, the laser is oriented so as to allow for maximum penetration of the beam emanating therefrom into the gap between the sheets, i.e., normal to the plane of both sheets for a butt-welding application, and is caused to travel along the joint formed between the two sheets at the rate of 30 inches per minute (12.4 mm/s) as through the use of an articulated support therefor.

Simultaneously, powdered AISI Type 316 stainless steel of a mesh size of $-140$, $+325$ is fed into and about the gap as described hereinabove at the rate of 3.5 pounds per hour (0.44 g/s) from the fixed nozzle of a Plasmatron Roto-Feed Hopper Model No. 1251 using helium as a carrier gas. The nozzle disperses the particulated gas stream so as to ensure a filler material deposition area on the sheets which fully encompasses the first area of direct laser beam impingement thereupon, thereby ensuring that a portion of the laser beam's energy is absorbed by filler material in order to prevent the direct exposure of the sheets to the full electromagnetic energy of the beam, as well as heating the portion of the filler material impinging upon said first area to a plastic state.

It is noted that, with regard to the above Example, empirical evidence suggests that approximately eighty percent of the electromagnetic energy of the defocussed laser beam 24 directly impinges upon the first area 26 on the exposed upper surfaces 28 of sheets 10 and 12, with the remaining twenty percent of the beam's energy being absorbed by the particulated gas stream 34 prior to the contact between the filler material entrained therein and the exposed surfaces 28 and gap faces 30 of the sheets 10 and 12.

It is to be noted that the instant invention contemplates any known method for causing a defocussed laser beam 24 to travel along the joint 14 formed between two sheet metal elements 10 and 12 which have been placed in as close contact as is permissible given local surface variations thereon. For example, in addition to the use of translating laser mounting structure 18 and stationary sheets 10 and 12 as described above, the invention contemplates the use of a stationary laser in combination with suitable means (not shown) for indexing the two sheets 10 and 12 beneath the defocussed beam 24 emitted therefrom.

It is further noted that the means employed for directing the powdered filler material into and about the gap 16 must be capable of forcibly delivering such filler material into even the most narrow of gap sections. Additionally, the means employed for filler material delivery under the instant method must be capable of suitably dispersing the filler material in a manner as to achieve a substantially uniform partial shielding of the upper surfaces 28 and gap faces 30 of sheets 10 and 12. Consequently, it will be readily appreciated that passive delivery methods such as the gravity feeding of filler material into and about the gap would be incapable of fulfilling either requirement.

While the preferred embodiment of the invention has been disclosed, it should be appreciated that the invention is susceptible of modification without departing from the spirit of the invention or the scope of the subjoined claims.

I claim:

1. A method for the welding together of sheet metal elements comprising the steps of:
   placing said sheet metal elements to be welded in as close contact as is permissible to form a joint therebetween;
   causing a defocussed beam of coherent electromagnetic energy to travel along said joint, a substantial portion of said beam impinging upon a first area on said sheet metal elements proximate with said joint to bring said first area to a substantially plastic state;
   simultaneously directing a powdered filler material towards a second area on said sheet metal element larger than and completely encompassing said first area of beam impingement thereon, a portion of said powdered filler material being brought to a substantially plastic state by the remaining portion of the energy of said beam prior to contacting said second area; and
   allowing said plasticized portion of said powdered filler material to attach to said first area and to build up thereupon to form a weld seam, whereby said sheet metal elements are joined together.

2. The method of claim 1 wherein said step of continuously directing a powdered filler material towards said second area on said sheet metal elements comprises the steps of
   entraining said powdered filler material in a carrier gas stream to obtain a particulated gas stream; and
   directing said particulated gas stream towards said second area on said sheet metal elements.

3. The method of claim 2 wherein said particulated gas stream is directed toward said second area on said sheet metal elements from behind said weld seam in the direction of travel of said energy beam relative to said joint.

4. The method of claim 2 including the step of cleaning a third area on said sheet metal elements proximately with said joint by blasting said third area with a plasticized portion of said particulated gas stream.

5. The method of claim 2 including the step of blasting the weld seam with a portion of said particulated gas stream not exposed to said energy beam, whereby an improved surface finish on said weld seam is obtained.

* * * * *